United States Patent [19]
Kane et al.

[11] Patent Number: 5,537,559
[45] Date of Patent: Jul. 16, 1996

[54] EXCEPTION HANDLING CIRCUIT AND METHOD

[75] Inventors: James A. Kane, Newport Beach; Graham B. Whitted, III, Irvine; Hsiao-Shih Chang, Orange, all of Calif.

[73] Assignee: Meridian Semiconductor, Inc., Irvine, Calif.

[21] Appl. No.: 193,241

[22] Filed: Feb. 8, 1994

[51] Int. Cl.[6] .................................................. G06F 9/32
[52] U.S. Cl. ........................................ 395/375; 364/DIG. 1
[58] Field of Search ........................... 395/375, 733–742; 371/16.1, 19

[56] References Cited

U.S. PATENT DOCUMENTS

| | | | |
|---|---|---|---|
| 3,718,912 | 2/1973 | Hasbrouck et al. | 395/375 |
| 4,223,381 | 9/1980 | Rozell et al. | |
| 4,442,484 | 4/1984 | Childs, Jr. et al. | |
| 4,714,994 | 12/1987 | Oklobdzija et al. | |
| 4,860,195 | 8/1989 | Krauskopf. | |
| 4,903,264 | 2/1990 | Talgam et al. | 371/16.1 |
| 4,972,338 | 11/1990 | Crawford et al. | |
| 4,974,154 | 11/1990 | Matsuo. | |
| 5,113,521 | 5/1992 | McKeen et al. | 395/650 |
| 5,239,642 | 8/1993 | Gutierrez et al. | |
| 5,297,263 | 3/1994 | Ohtsuka et al. | 395/375 |
| 5,341,500 | 8/1994 | Moyer et al. | |
| 5,371,894 | 12/1994 | DiBrino | 395/800 |
| 5,450,555 | 9/1995 | Brown, III et al. | 395/375 |
| 5,479,616 | 12/1995 | Garibay et al. | |
| 5,481,683 | 1/1996 | Karim | 395/375 |

OTHER PUBLICATIONS

The i486 Processor Programmer's Reference Manual, Intel, 1990, pp. 2–18 to 2–24.
Tannenbaum, Structured Computer Organization, Porentice-Hall, Inc., 1976, pp. 18–28.
McGraw–Hill, Inc., Electronics, Feb. 24, 1981 (international edition) (Article on International Solid State Circuits Conference, beginning on p. 138).
Intel i486™ Microprocessor Reference Manual, Intel Corporation, 1989; Order No.: 240440–001; pp. 134–137.

*Primary Examiner*—William M. Treat
*Attorney, Agent, or Firm*—Knobbe, Martens, Olson & Bear

[57] ABSTRACT

A microprocessor circuit monitors addresses generated by the microprocessor to check for various address-exception conditions. Fetch-exception status bits are generated for each instruction byte to indicate whether an address-exception was detected for each respective byte address. Once fetches are performed, the fetch-exception status bits are fed to an instruction buffer with the corresponding instruction bytes, where they are maintained until execution. Decode logic of an instruction control unit analyzes the fetch-exception status bits upon execution, and generates exceptions before the corresponding exception-causing instructions are executed. Address-exceptions occurring as the result of operand accesses are handled immediately. The operand access causing the exception is aborted, and the decode of the following instruction is modified to generate a micro-interrupt. A micro-interrupt routine determines the cause of the interrupt, and generates the appropriate exception. For breakpoint exceptions on operand accesses, the micro-interrupt routine re-executes the breakpoint-causing instruction to completion before generating the appropriate exception.

19 Claims, 4 Drawing Sheets

EXCEPTION HANDLING CIRCUIT AND METHOD

FIELD OF THE INVENTION

This invention relates to microprocessors. In particular, this invention relates to a circuit and method for handling exceptions.

BACKGROUND OF THE INVENTION

An exception is an event in which the execution of a particular macroinstruction by a microprocessor requires special handling. When an exception occurs, the microprocessor alters the normal program flow to report or correct the condition causing the exception. This is normally done by invoking an appropriate exception service routine.

Exceptions are generally classified as faults, traps or aborts, depending upon the way the event is reported, and whether or not the instruction causing the exception can be restarted or re-executed by the microprocessor. Faults are exceptions that are detected and serviced before the execution of the faulting instruction. Traps are exceptions that are reported immediately after the execution of the instruction which causes the exception. Aborts are exceptions which do not permit the precise location of the instruction causing the exception to be determined.

Microprocessors commonly contain logic for performing a variety of exception checks on addresses generated by the microprocessor (hereinafter "address-exception" checks). Three types of address-exception checks are of particular importance to the present invention. The first is an address limit check. Address limit checks are typically performed by microprocessors that use segmentation. The purpose of the address limit check is to prevent a program from accessing memory outside a given variable-size segment. To perform the address limit check, the microprocessor compares each generated memory address to the addresses representing the upper and lower boundaries of the appropriate segment. The upper and lower segment boundaries are specified by internal registers which are typically loaded by the operating system. If an instruction attempts to access memory outside of the designated segment, the microprocessor generates a limit error exception. Limit errors are generally treated as either traps or faults.

The second type of exception check is a page fault check. This type of exception occurs with microprocessors having paging capabilities whenever the microprocessor references a page which is not present in memory. Upon the occurrence of a page fault, the microprocessor invokes the appropriate service routine which loads the necessary page into memory. The microprocessor then restarts the instruction which caused the fault.

The third type of exception check of importance to the present invention is a breakpoint check. A breakpoint is a type of exception that can be intentionally generated upon the occurrence of a predetermined event, for the purpose of facilitating program or hardware debugging. Upon the occurrence of the event, an exception service routine is taken which allows the debugger to examine the contents of internal registers.

One type of event which can be used to generate breakpoint exceptions is the generation of predetermined addresses for accessing either code or data. For example, the microprocessor can be set up to generate a breakpoint exception whenever an instruction located at a specified address is executed, or when operand data is written to a specified address. Breakpoints resulting from instruction fetches are typically taken as faults (i.e., before the instruction is executed), and breakpoints resulting from operand accesses are typically taken as traps (i.e., after the data transfer takes place).

In order to properly handle limit error, page fault and breakpoint exceptions, the microprocessor must be able to identify the instruction causing the exception, and prevent subsequent instructions from being executed before taking the exception. For page faults and limit errors, the microprocessor must also halt the execution of the exception-causing instruction. If the exception-causing instruction and subsequent instructions are not halted before taking the exception, the state of the machine or memory may change. For example, if a limit error is not immediately handled, a memory location outside of a data segment may be overwritten, corrupting necessary data. Or, if a breakpoint exception is not immediately taken, registers internal to the microprocessor may change after a breakpoint event occurs, making it difficult for the debugger to isolate a problem.

The task of tracking the exception-causing instruction and preventing the execution of subsequent instructions becomes complex when the microprocessor uses a high degree of pipelining, or when the microprocessor has the capability of executing instructions in parallel. Once it has been determined that an instruction in the pipeline will cause an exception, one or more subsequent instructions will typically have already entered the pipelines, and the program counter will point to some instruction other than the exception-causing instruction.

As a result, microprocessors commonly reduce pipelining and/or parallel instruction execution when certain types of address-exception checks are enabled. For example, microprocessors in the ×86 family are normally designed to reduce pipelining and/or parallel instruction execution whenever breakpoints are enabled. Although this technique allows the microprocessor to take the exception at the correct time, it has the disadvantage of slowing down the rate of program execution. In the case of breakpoints, it is undesirable to slow down program execution, especially when the program debugger is attempting to debug a time-dependent bug.

The present invention is concerned with the problem of ensuring that address-exceptions are taken at the correct time, without a change in the state of the machine or memory. For purposes of describing the present invention, the following terminology will be used. The term "fetch" will refer to the reading of code (i.e, instructions) from memory. "Operand" will refer to memory accesses involving non-code data. "Fetch-exception" will refer to an exception resulting from a fetch from a specific address or range of addresses. "Operand-exception" will refer to an exception resulting from an operand access. "Take" or "generate," when referring to an exception, will refer to the process of causing an exception service routine to be entered. "Detect," when referring to an exception, will refer to the process of checking for exception-causing events, the detection of which may or may not result in the generation of an exception. "Instruction" will refer to a macroinstruction which is part of the instruction set of the subject microprocessor.

SUMMARY OF THE INVENTION

The present invention relates to a microprocessor circuit and method for handling address-exceptions. An exception circuit monitors addresses generated by an executions unit of the microprocessor as memory access requests are passed from the execution unit to a bus unit of the microprocessor. In the exemplary embodiment described herein, limit error, page fault and breakpoint exceptions are detected and handled, although the circuit and method of the present invention are equally applicable to other types of address-exceptions.

Address-exceptions are handled differently depending upon whether the exception-causing condition is the result of a fetch ("fetch-exception"), or the result of an operand access ("operand-exception"). For fetch-exceptions, fetch-exception status bits are generated for every instruction byte to be fetched. The fetch-exception status bits indicate the type of exception detected (limit error, page fault, breakpoint, etc.), if any, for each instruction byte address. After instruction fetches are performed by the bus unit, the instruction bytes and corresponding fetch-exception status bits are fed to an instruction buffer. The instruction buffer maintains the instructions and corresponding fetch-exception status bits until execution. Upon execution, decode logic of an instruction control unit analyzes the instructions (op-codes) and corresponding fetch-exception status bits to determine whether an exception should be generated. To generate an exception, the decode logic generates a micro-instruction to cause a branch to the appropriate service routine for the specific type of exception detected.

In an alternative embodiment, a fetch address queue is incorporated within the bus unit to store fetch-addresses of fetch requests which the bus unit cannot immediately perform. The fetch address queue maintains the fetch-exception status bits with the corresponding requests until the requested fetches are performed. Once the bus unit retrieves the requested instruction data from memory, the instruction data and corresponding fetch-status data are fed from the fetch address queue to the instruction buffer. Instructions and corresponding fetch-exception status bit are then maintained by the instruction buffer until execution.

In contrast to fetch-exceptions, operand-exceptions are taken immediately upon detection by the exception circuit. Operand-exception status bits are generated and maintained in an operand status register upon detection of an operand-exception. On the same clock cycle that an operand-exception is detected, the operand access is aborted, and a signal is provided to the decode logic of tile instruction control unit. The instruction control unit modifies the decode of the immediately-following instruction to generate a micro-interrupt. A micro-interrupt routine is then entered, and the operand status register is read to determine the cause of the operand-exception. If the operand-exception status bits indicate that a breakpoint has occurred, the micro-interrupt routine re-executes the breakpoint-causing instruction to completion before generating a branch to a breakpoint service routine. If the operand-exception status bits indicate that a limit error or a page fault occurred, the micro-interrupt routine generates a branch to the appropriate service routine without re-executing the exception-causing instruction.

The circuit and method of the present invention provide a relatively simple solution to the problem of tracking address-exceptions and generating the exceptions at the appropriate point in time. No complex logic is required to determine which instruction caused the breakpoint. Moreover, all fetch-exceptions and operand-exceptions are taken immediately upon execution of the exception-causing instruction without reducing pipelining or otherwise slowing down the microprocessor.

The circuit and method of the present invention are particularly applicable to microprocessors which achieve a high degree of pipelining, and superscalar microprocessors capable of parallel execution of instructions.

BRIEF DESCRIPTION OF THE DRAWINGS

In the drawings, like reference numbers indicate identical or functionally similar elements. Additionally, the left-most digit of a reference number identifies the drawing in which the reference number first appears.

DETAILED DESCRIPTION OF THE INVENTION

Figure 1:
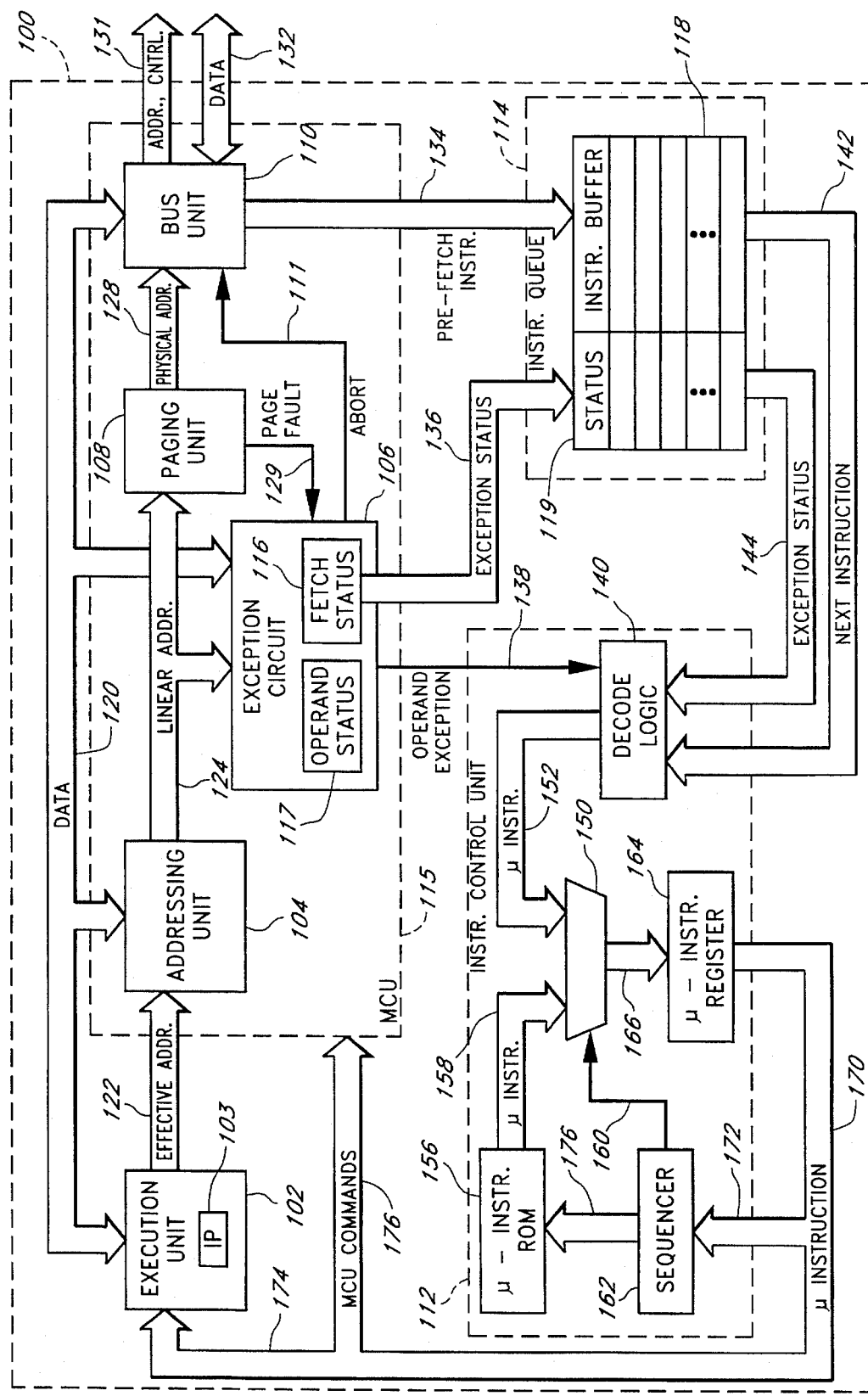
FIG. 1 is a high-level block diagram of a microprocessor which includes the exception-handling logic of the present invention.

FIG. 1 is a high-level block diagram of a microprocessor 100 having paging and instruction pipelining capabilities, and optionally having memory segmentation capabilities. The microprocessor 100 includes the hardware of the present invention for handling breakpoint, page fault and limit error exceptions.

The microprocessor 100 has an execution unit 102, an addressing unit 104, an exception circuit 106, a paging unit 108, a bus unit 110, an instruction control unit 112, and an instruction queue 114. The execution unit 102 has an instruction pointer 103. The addressing unit 104, exception circuit 106, paging unit 108 and bus unit 110 collectively form a memory control unit 115 ("MCU").

The execution unit 102 provides effective addresses to the addressing unit 104 over a bus 122. The addressing unit 104 provides linear addresses to the exception circuit 106 and the paging unit 108 over a bus 124. The paging unit 108 provides physical addresses to the bus unit 110 over a bus 128. The paging unit also provides a page fault signal to the exception circuit 106 on the line 129. An internal data bus 120 connects the execution unit 102, addressing unit 104, exception circuit 106, and bus unit 110. The bus unit 110 interfaces the microprocessor 100 to external devices and memory (not shown) via an address/control bus 131 and a data bus 132.

The exception circuit 106 has a fetch status register 116 for storing fetch-exception status for individual instruction bytes being fetched from memory. The exception circuit 106 also has an operand status register 117 for storing operand-exception information. A fault signal is provided by the exception circuit 106 to the bus unit 110 the line 111

The instruction queue 114 has an instruction buffer 118 for holding instructions received on an instruction bus 134. The instruction buffer 118 has a status field 119 for storing the fetch-exception status of individual bytes of instructions held by the buffer 118. The status information stored by the status field 119 is provided by the exception circuit 106 over a bus 136.

The instruction control unit 112 has decode logic 140 for generating micro-instructions based on instructions received from the instruction queue 114 over the bus 142. The decode logic 140 also receives fetch-exception status data over the bus 144, and operand-exception information over the line 138. Micro-instructions generated by the decode logic 140 are fed to a first input of a multiplexer 150 by a bus 152. Micro-instructions are additionally supplied by a micro-instruction ROM 156, which provides micro-instructions to a second input of the multiplexer 150 over a bus 158. The multiplexer 150 has a control input 160 generated by a sequencer 162. The sequencer 162 provides address and control information to the micro-instruction ROM 156 over a bus 176.

Micro-instructions on the path selected by the multiplexer 150 are fed to a micro-instruction register 164 on a bus 166. Micro-instructions held by the micro-instruction register 164 are placed on a bus 170. A micro-instruction field is fed from the bus 170 to the sequencer 162 by a bus 172. Micro-instruction fields are also fed to the execution unit 102 on the bus 174, and the MCU 115 on the bus 176. To simplify the diagram, micro-instruction paths to the components 104, 106, 108, 110 of the MCU 115 are not shown.

A general description of the operation of the microprocessor 100 will initially be provided with reference to FIG. 1. This general description will provide the necessary overview for describing the circuit and method of the present invention for handling address-exceptions. Separate cycle-by-cycle descriptions will then be provided for fetch-exceptions and for operand-exceptions. Finally, an alternative embodiment of the invention will be presented which makes use of a fetch address queue.

1. General Operation

The execution unit 102 generates effective addresses that are provided to the addressing unit 104 on the bus 122. Each effective address specifies a virtual memory address for performing either a fetch or an operand access. On the clock cycle immediately following the generation of an effective address, an MCU command is issued to the MCU 115 over the bus 176. This cycle will hereinafter be referred to as the "command cycle." The MCU command specifies the type of memory access to be performed using the effective address.

During the command cycle, the addressing unit 104 translates the effective address into a linear address, and places the linear address on the bus 124. The linear address is generated by the addressing unit 104 according to the particular addressing scheme used by the microprocessor 100, if any. For purposes of this description, it may be assumed that a memory segmentation addressing scheme is used. Accordingly, the addressing unit 104 contains a set of segment registers (not shown) for defining the lower boundaries of individual memory segments. The addressing unit 104 generates linear addresses by adding the effective address to the base address specified by the appropriate segment register. The details and advantages of implementing memory segmentation are well-understood by those skilled in the art.

The linear address is fed to the paging unit on the bus 124. The paging unit 108 checks the linear address to determine whether or not the requested code or operand data is in memory. If the requested data is not in memory, the paging unit 108 asserts a page fault signal on the line 129, indicating the a new page of data must be moved to memory. If the requested data is in memory, the paging unit 108 translates the linear address corresponding to a fetch or operand access into a physical address uniquely identifying a particular memory location or range of memory locations.

The physical address on the bus 128 is used by the bus unit 110 to perform the requested memory access on the busses 131, 132. The bus unit may optionally include a cache (not shown). If the requested access is an operand read, the requested data is placed on the data bus 120. If the requested access is a fetch, the bus unit returns the requested code data on the bus 134, and the code data is buffered by the instruction queue 114. For purposes of this discussion, it should be assumed that a variable instruction-length format is used.

The exception circuit 106 continuously monitors linear addresses being placed on the bus 124 by the addressing unit 104. The exception circuit 106 contains a set of debug registers (not shown) for allowing the program debugger to define specific breakpoint events. The circuitry used for defining and detecting breakpoint events is beyond the scope of the present invention.

The exception circuit 106 also contains a set of registers (not shown) for specifying certain attributes of memory segments, including the upper and lower boundaries of each memory segment. The exception circuit 106 uses limit error detection circuitry (not shown) for performing address limit checks on linear addresses on the bus 124 based on the values of these registers.

The microprocessor 100 checks for and handles page fault, breakpoint, and limit error exceptions in a unique manner. Significantly, all exception checking is performed during the command cycle. Once an exception has been detected, the method used for handling the exception depends upon whether the exception resulted from a fetch or from an operand access. Each situation is discussed separately below.

2. Fetch-Exceptions

For fetches, the exception circuit 106 generates two fetch-exception bits for each instruction byte being fetched from memory. The fetch-exception bits are generated according to Table 1.

TABLE 1

| STATUS BITS | INDICATION |
|---|---|
| 0 0 | Limit Error |
| 0 1 | Page Fault |
| 1 0 | Breakpoint |
| 1 1 | No Exceptions |

The fetch-exception bits are temporarily stored in the fetch status register 116. As fetch data (i.e., instruction data) is fetched from memory and placed in the instruction buffer 118, the fetch-exception bits corresponding to the individual instruction bytes of the fetch data are provided to the instruction queue 114 on the bus 136, and stored in the status field 119 of the instruction buffer 118 along with the corresponding instruction bytes. Individual instructions move through the buffer 118 along with their corresponding fetch-exception bits. If a jump or branch instruction occurs, and a particular instruction in the buffer 118 is not executed as a result, the fetch-exception bits associated with that instruction will be purged along with the instruction. Thus, a page fault, breakpoint or limit error detected on a fetch command cycle will be taken only if the instruction is actually executed.

Instructions and corresponding fetch-exception bits are fed to the instruction control unit 112 on the busses 142 and 144. The decode logic 140 processes the fetch-exception bits along with the op-codes for the instructions, and generates micro-instructions accordingly. To generate an exception, the decode logic 140 generates a micro-instruction which causes a branch to an exception service routine.

In processing the fetch-exception bits, the decode logic 140 gives higher priority to page faults and limit errors, so that a breakpoint will be ignored if either a page fault or a limit error is active for a given instruction byte. Breakpoints indicated by the fetch-exception bits are also ignored for all instruction bytes other than the first byte of an instruction. Thus, a breakpoint exception will be generated by the decode logic 140 only in the event that the first instruction byte of an instruction has a status indicating an active breakpoint, and no other exception is indicated by the fetch-exception bits for that byte. Page fault and limit error exceptions will be taken upon decode whenever indicated by the fetch-exception bits.

Once the decode logic 140 determines that an exception will be taken, instruction decode is suspended, allowing all currently-executing instructions in the pipeline (not including the exception-causing instruction) to be completed. The decode logic 140 then generates the appropriate exception by outputting a micro-instruction on the bus 152 to cause a branch to an exception service routine. The bus 152 input to the multiplexer 150 is selected, and the micro-instruction causing the branch is latched by the micro-instruction register 164, and fed to various units of the microprocessor 100 on the bus 170.

To summarize, fetch-exceptions are checked when the command to perform the fetch is received. Status bits indicating the fetch-exception for each byte of fetch data are generated and stored in the fetch status register 116. When the fetch access is complete, the fetch-exception bits and corresponding instruction data are returned by the MCU 115 and placed in the instruction buffer 118. The instruction data and corresponding fetch-exception bits are held by the instruction buffer 118 until execution, or until the buffer is flushed. Upon execution of instructions, fetch-exception bits corresponding to individual instruction bytes are evaluated by the decode logic 140. Based on exception priority and special rules for breakpoints, the decode logic 140 determines whether a fetch-exception should be taken. To generate a fetch-exception, the decode logic 140 generates a micro-instruction which causes a branch to an exception service routine.

By handling fetch-exceptions as described above, with exception checking performed during the fetch command cycle and fetch-exception thereafter maintained with individual instruction bytes until execution, the instruction control unit 112 immediately ascertains the exception-causing instruction upon execution. Fetch-exceptions are thereby taken immediately prior to execution of the exception-causing instruction. Furthermore, no special logic is required to determine which instruction caused the fetch-exception. Unlike prior art systems, the circuit and method of the present invention guarantee that all fetch-exceptions will be taken without executing any subsequent instructions, even when the microprocessor is operating at full speed.

Although the above-described embodiment of the present invention has been described with reference to three specific types of address-exceptions, it should be understood that the novel concept of maintaining fetch-exception status with instruction data can be used with other types of address-exception checks. For example, a third status bit can easily be added for maintaining an alignment-check exception status. Thus, the specific types of address-exception checks presented are not intended to limit the scope of the present invention.

3. Operand-exceptions

As with fetch-exceptions, the exception circuit 106 and paging unit 108 check for operand-exceptions during the command cycle by monitoring linear addresses appearing on the bus 124. However, if an operand-exception is detected, the exception circuit 106 operates differently than for fetch-exceptions. On a command cycle for which an operand-exception is detected, the exception circuit 106 asserts the abort signal on the line 111. The bus unit 110 responds to the assertion of the abort signal by aborting the operand access giving rise to the exception. During the same cycle, the exception circuit generates two operand-exception status bits, indicating the type of exception detected. The operand-exception status bits are generated according to Table 1, and stored in the operand status register 117 for subsequent use.

Also during the same cycle, the exception circuit 106 asserts the operand-exception signal on the line 138. The instruction control unit 112 responds to the assertion of the operand-exception signal differently depending upon the phase of execution of the next instruction in the pipeline. In order to fully describe the method used by the instruction control unit 112 for handling operand-exceptions, a description of the normal operation of the instruction control register 112 must initially be provided.

The instruction control unit. 112 outputs one micro-instruction on the bus 170 during each clock cycle. The number of clock cycles per instruction varies depending upon the particular instruction being executed. For all instructions, the first micro-instruction is generated by the decode logic 140, and subsequent micro-instructions, if any, are provided by the micro-instruction ROM 156. Thus, on the first clock cycle of an instruction, the sequencer 162, selects the bus 152, allowing the micro-instruction from the decode logic 140 to pass through the multiplexer 150 to the micro-instruction register 164. For instructions requiring more than one clock cycle, this first micro-instruction contains an address field specifying the ROM 156 address of the second micro-instruction. This address field is provided to the sequencer 162 on the bus 172. For clock cycles 2 through N, where N is the number of cycles required to execute the instruction, the sequencer 162 addresses ROM locations on the bus 176, and selects the micro-instruction bus 158 from the ROM 156.

The instruction control unit 112 handles operand-exceptions differently depending upon whether the next micro-instruction (i.e., the micro-instruction being generated when the exception is detected) is being generated from the decode logic 140 or from the micro-instruction ROM 156. This depends upon the execution phase of the next instruction in the pipeline.

Figure 2:
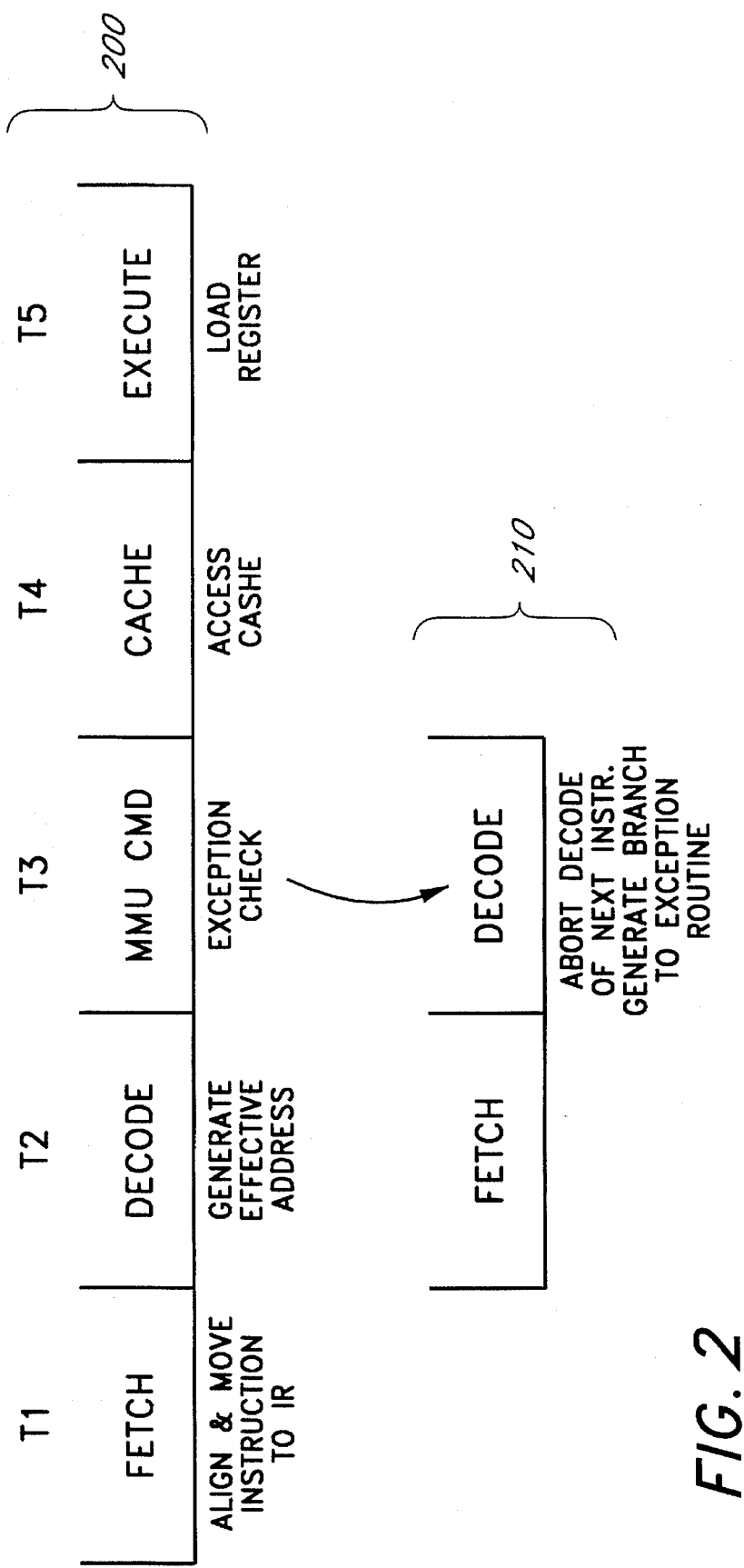
FIG. 2 is a timing diagram for an operand-exception wherein the exception is detected during the decode phase of the following instruction.

FIG. 2 illustrates the approach used when the next micro-instruction is being generated by the decode logic 140. The execution phases and relative timings of two instructions, 200 and 210, are shown as the instructions progress through the pipeline. The first instruction 200 generates an operand-exception, causing an abort of the decode of the second instruction 210.

Referring to FIGS. 1 and 2, during the first clock cycle T1, the first instruction 200 is fetched from the instruction queue 118. The instruction is aligned and placed in an instruction register (not shown) of the instruction control unit 112 for decode.

During the second clock cycle T2, the decode logic 140 generates a micro-instruction on the bus 152, which is passed through the multiplexer 150 to the micro-instruction register 164. During the same cycle, the micro-instruction is passed to the execution unit 102 on the bus 170, and the execution unit 102 generates an effective address on the bus 122. Additionally, a fetch of the second instruction 210 is performed.

During the third clock cycle T3, the instruction control unit 112 issues a command to the MCU 115, specifying the type of operand access to perform. The addressing unit 104 responds by generating a linear address on the bus 124. The exception circuit 106 and paging unit 108 check the linear address for exceptions. An exception is detected during this cycle, and the operand-exception signal is asserted on the line 138. During the same cycle, the decode logic 140 is in the process of generating the first micro-instruction for the second instruction 210. The decode logic 140 responds to the signal on the line 138 by aborting the decode of the second instruction 210, and generating a micro-instruction which causes a micro-interrupt. Thus, execution both of the instructions 200, 210 are halted, and the microprocessor 100 enters into a micro-interrupt service routine.

Figure 3:
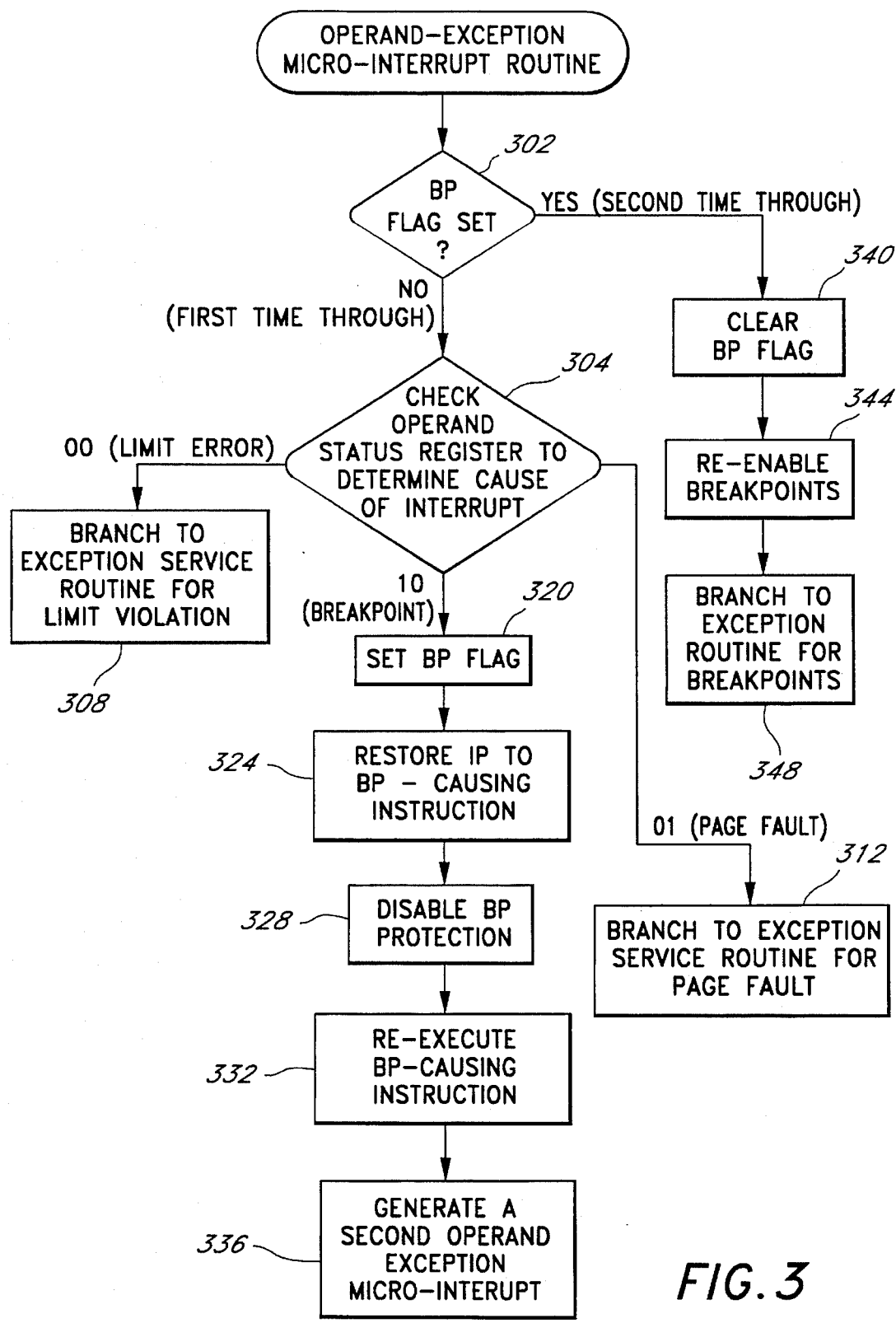
FIG. 3 is a flow chart of for a micro-interrupt routine for operand-exceptions.

FIG. 3 is a flow chart for the micro-interrupt service routine entered in response to the operand-exception. The service routine is in the form a sequence of micro-instructions that are issued prior to entering the appropriate exception service routine. The purpose of the routine is to determine the cause of the operand-exception, and to re-execute the exception causing instruction if the exception was caused by a breakpoint.

Referring to FIG. 3, the status of a breakpoint (BP) flag internal to the execution unit 103 is initially tested, as indicated by the decision block 302. This flag is used to indicate whether the micro-interrupt routine is being entered for a second consecutive time, as will be apparent from the following description. On the first pass through the micro-interrupt routine, the BP flag will always be low. The operand-exception status bits held by the operand status register 117 are therefore checked to determine the cause of the exception, as indicated by the decision block 304. If the operand-exception status bits indicate a limit violation, a micro-instruction is generated by the decode logic 140 to cause a branch to the appropriate exception service routine for a limit violation, as indicated by the process block 308. Similarly, if the operand-exception status bits indicate a page fault, a micro-instruction is generated for causing a branch to the appropriate exception service routine for handling a page fault, as indicated by the process block 312.

If the operand-exception status bits indicate a breakpoint, the micro-interrupt routine performs the operations indicated by the process blocks 320 through 336. Thus, on the first pass through the routine after a breakpoint occurs, the BP flag is set high, the instruction pointer 103 (IP) is restored to point to the instruction which caused the breakpoint, and breakpoint detection is disabled, as indicated by the process blocks 320, 324 and 328. The breakpoint-causing instruction is then re-executed, as indicated by the process block 332. Since breakpoint detection is disabled, the instruction executes to completion, as necessary to leave the microprocessor 100 in the proper state for entering a breakpoint service routine. A second operand-exception micro-interrupt is then generated, as indicated by the process block 336.

In response to the second micro-interrupt, the microprocessor 100 tests the BP flag, as indicated by the decision block 302. Since the BP flag was set on the first pass, the microprocessor 100 performs the operations indicated by the process blocks 340 through 348. The BP flag is cleared and breakpoints are re-enabled, as indicated by the process blocks 340 and 344. A micro-instruction is then generated to cause a branch to an exception routine for breakpoints, as indicated by the process block 348. This exception service routine permits program debuggers to examine the contents of internal registers immediately following execution of the breakpoint-causing instruction.

The method described above for handling operand-exceptions allows the microprocessor 100 to determine the exception-causing instruction and to prevent the execution of that instruction and subsequent instructions. For page faults and limit errors, the exception is taken prior to execution of the exception-causing instruction, allowing the condition to be corrected before re-execution of the instruction.

For breakpoints, through use of the micro-interrupt routine, the exception is taken immediately following execution of the exception-causing instruction, even though the microprocessor is running at full speed at the time of breakpoint detection. Thus, the problem experienced with prior art microprocessors which must be slowed down is overcome.

As illustrated by FIG. 2, the circuit and method of the present invention permit operand breakpoint exceptions to be taken at the proper time where the next instruction 210 in the pipeline lags behind the exception-causing instruction by as little as a single clock cycle. Thus, the circuit and method are applicable to microprocessors which use a high degree of pipelining.

As one skilled in the art will recognize, the circuit and method described above are also applicable to superscalar microprocessors capable of parallel instruction execution, provided that the pre-execution phases of instructions executed in parallel are overlapped as shown in FIG. 2. In other words, provided that the MCU command phase of the first instruction 200 falls before or during the decode phase of the of the instruction 210, the execution of the instruction 210 can be halted, even if the execution phases of the instructions 200 and 210 would normally be performed in parallel.

The instruction control unit 112 handles operand-exceptions slightly differently if the next micro-instruction following the exception detection will be generated using the micro-instruction ROM. This situation results when the instruction following the exception-causing instruction has not yet entered the decode phase when the exception is detected. For example, this situation would arise with the instructions shown in FIG. 2 if the decode phase of the second instruction 210 were delayed until the fourth or the fifth clock cycle T4, T5.

In this event, no micro-interrupt is generated until a micro-instruction is generated by the decode logic 140. Thus, the instruction control unit 112 initially disregards the operand-exception signal on the line 138, and continues to operate normally with micro-instructions being read from the micro-instruction ROM 156. Once the immediately-following instruction enters into the decode phase of execution a micro-instruction is generated causing a micro-interrupt. The micro-interrupt is then handled as described above with reference to FIG. 3.

4. Fetch Address Queue Embodiment

Figure 4:
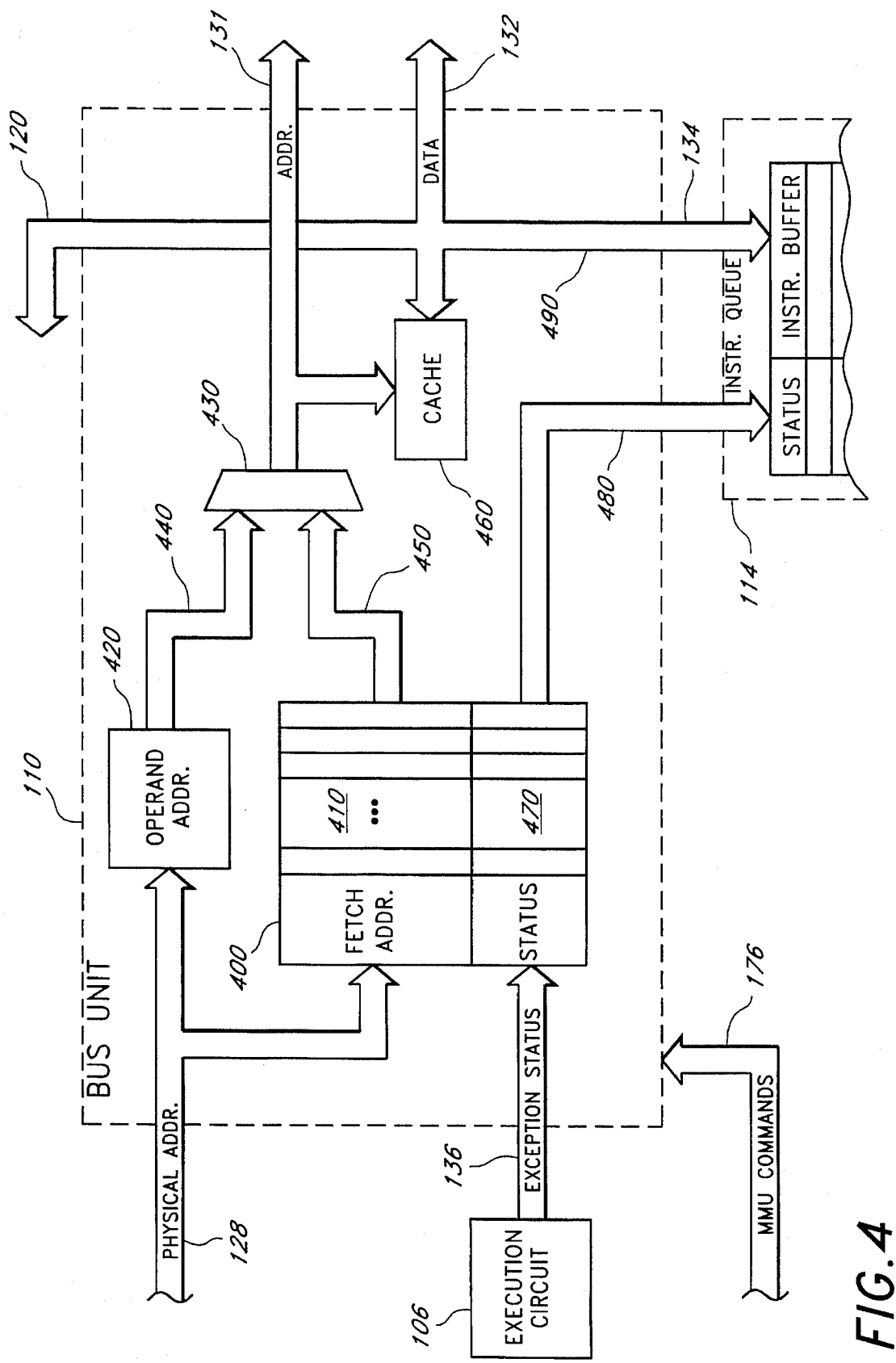
FIG. 4 is a high-level block diagram of bus unit which includes a fetch address queue.

An alternative embodiment of the present invention will now be described with reference to FIG. 4. FIG. 4 is a high-level diagram of an embodiment of the bus unit 110 which includes a fetch address queue 400 for queuing fetch requests. The diagram is representative of the microprocessor of FIG. 1, except that fetch-exception status on the bus 136 is passed through the fetch address queue 400 before being routed to the instruction queue 114.

Referring to FIG. 4, physical addresses on the bus 128 for fetch requests are fed into an address portion 410 of the fetch address queue 400. Physical addresses on the bus 128 for operand access requests are fed to an operand address register 420. A multiplexer 430 selects between addresses from the operand register 420 on the bus 440 and addresses from the fetch address queue 400 on the bus 450. Addresses selected by the multiplexer 430 are fed to the cache 460 and to the external address bus 131. The fetch address queue 400 has a status field 470 for maintaining fetch-exception status in the form of fetch-exception status bits. Status data is provided by the exception circuit 106 over the bus 136. Status data from the fetch address queue 400 is passed to the status field 119 of the instruction buffer 118 on the bus 480. A data bus 490 allows data to pass between the external data bus 132, the cache 460, and the data bus 120. MCU commands are provided to the bus unit 110 by the instruction control unit 112 over the bus 176.

Operation of the bus unit 110 of FIG. 4 will now be described. As MCU commands are issued on the bus 176 for performing fetches, physical addresses on the bus 128 enter into the address portion 410 of the fetch address queue 400. These physical addresses specify the starting addresses for code fetches of fixed numbers of bytes. Corresponding fetch status data is provided on the bus 136, and stored with the fetch requests until the fetch requests are either performed or flushed from fetch address queue 400. The status data associated with each fetch request consists of one or more fetch-exception status bits for each instruction byte to be fetched. Thus, for a microprocessor having a fixed fetch size of 16 bytes, and a fetch-exception status value of 2 bits per instruction byte, a 32-bit status field will be maintained with each fetch request.

Physical addresses on the bus 128 for operand accesses are passed to an operand address register 420. MCU commands issued on the command bus 176 indicate the type of memory accesses to be performed by the bus unit 110, and thus indicate whether a given physical address should be routed to the fetch address queue 400 or the operand address register.

As operand access requests are received by the bus unit 110 on the bus 176, the operand accesses are immediately attempted. If the bus unit 110 cannot perform the operand access, the bus unit 110 waits until it can, suspending all other operations. Thus, the bus unit 110 gives priority to operand access requests over fetch requests. As operand data becomes available from either the cache 460 or external memory, it is placed on the data bus 120.

As fetch requests are received on the bus 176 they are attempted immediately if no pending fetch requests are currently queued. If a fetch request is attempted but cannot be performed (because of a pending higher-priority operand request or other operation), the request is placed in the fetch address queue 400. Once in the fetch address queue, fetch requests are attempted on every available access slot until either performed or canceled. Fetch requests may be canceled by MCU commands (micro-instructions) on the bus 176.

The fetch address queue 400 allows the microprocessor to achieve a higher level of performance by optimizing the bandwidth of the memory busses 131, 132. Prior art microprocessors normally cancel fetch requests that cannot be immediately performed, and then issue new identical fetch requests at a later time. This has the disadvantage of not utilizing every possible access slot on the memory busses 131, 132. The fetch address queue 400 overcomes this limitation by attempting pending fetch requests on every available access slot on the memory busses 131, 132, thereby maximizing throughput, and minimizing interference between fetch requests and operand access requests.

As fetch data is read from cache 460 or external memory, it is buffered by the bus unit 110 (buffers not shown) until the fetch access is complete. The fetch data is then provided to the instruction queue 114 on the bus 134 and placed in the instruction buffer. The fetch-exception status bits associated with the fetch data are simultaneously fed from the status field 470 of the fetch address queue 400 to the status field 119 of the instruction buffer 118. Instructions and corresponding fetch-exception status bits are then processed by the instruction control unit 112 as described with reference to FIG. 1.

As indicated by the above description, the embodiment illustrated by FIG. 4 makes use of the concept of the present invention of maintaining fetch-exception status information with instruction data from the time of address-exception checking to the time of execution. The addition of the fetch address queue 400, however, requires that fetch-exception status be maintained with pending fetch requests for which address-exception checking has already been performed. Thus, fetch-exception status data is passed through the fetch address queue with fetch requests until the requests are performed.

Finally, it should be noted that the addition of the fetch address queue 400 to the bus unit 112 does not modify the circuit and method described for handling operand-exceptions. Thus the description provided with reference to FIGS. 1, 2 and 3 for the handling of operand-exceptions applies equally to the embodiment illustrated by FIG. 4.

The circuit and method described for handling address-exceptions has been presented by way of example only, and not limitation. Thus, the breadth and scope of the present invention should not be limited by any of the above-described exemplary embodiments, but should be defined only in accordance with the following claims and their equivalents.

What is claimed is:

1. A circuit that detects and handles fetch-exceptions for a microprocessor without slowing down the normal operation of said microprocessor, comprising:

an exception circuit that monitors fetch-addresses generated by an execution unit of said microprocessor, and that performs fetch-exception checks on said fetch-addresses before said fetch-addresses are used by said microprocessor to fetch instructions from a memory, said exception circuit generating one or more fetch-exception status bits for each instruction byte of said instructions;

an instruction buffer that receives and stores said instructions fetched by said microprocessor, and that receives and stores said fetch-exception status bits corresponding to said instruction bytes of said instructions, said instruction bytes and said corresponding fetch-exception status bits being held by said instruction buffer until said instructions are executed; and an instruction control unit that receives said instruction bytes and said corresponding fetch-exception status bits, and that generates micro-instructions based on said instruction bytes and said corresponding status bits, said micro-instructions causing exceptions to be taken by said microprocessor when said fetch-exception status bits indicate a fetch-exception condition.

2. A circuit that detects and handles fetch-exceptions for a microprocessor as defined in claim 1, further comprising a fetch address queue that temporarily stores a fetch-address when said microprocessor cannot immediately perform a requested fetch with said fetch address, and that stores fetch-exception status bits corresponding to said fetch-address, said fetch-address and said corresponding fetch-exception status bits being held until said requested fetch is performed, said fetch exception status bits being transferred to said instruction buffer when said requested fetch is performed.

3. A circuit that detects and handles fetch-exceptions for a microprocessor as defined in claim 1 combined with said memory, said memory being external to said microprocessor, said memory holding said instructions for said microprocessor.

4. A circuit that detects and handles operand-exceptions for a microprocessor without slowing down the normal operation of said microprocessor, comprising:

an exception circuit that monitors operand-addresses generated by an execution unit of said microprocessor, and that performs operand-exception checks on said operand-addresses before said operand-addresses are used by said microprocessor to perform operand-accesses to memory, said exception circuit generating an exception signal on an exception signal line, said exception signal indicating detected exceptions; and an instruction control unit that receives and decodes instructions and that generates micro-instructions based on said instructions, said instruction control unit comprising decode logic for generating a first micro-instruction for an instruction, said decode logic receiving said exception signal line from said exception circuit, said decode logic modifying a decode of said instruction when said exception signal on said exception signal line is active, said modified decode producing a micro-instruction to abort execution of said instruction and to cause a micro-interrupt.

5. A circuit that detects and handles operand-exceptions for a microprocessor as defined in claim 4, wherein said exception circuit detects breakpoint operand-exceptions.

6. A circuit that detects and handles operand-exceptions for a microprocessor as defined in claim 4, wherein said decode logic modifies said decode to cause said micro-interrupt on a same clock cycle that said operand-exception is detected.

7. A circuit that detects and handles operand-exceptions for a microprocessor as defined in claim 4, wherein said exception circuit further generates and maintains one or more operand-exception status bits indicating a type of operand-exception detected.

8. A circuit that detects and handles operand-exceptions for a microprocessor as defined in claim 4 combined with said memory, said memory being external to said microprocessor.

9. A method of testing for and processing address exceptions when an instruction is read into a microprocessor from a memory, said microprocessor comprising an instruction queue that simultaneously holds multiple instructions prior to execution of said instructions by said microprocessor, the method comprising the steps of:

(a) testing a fetch address and generating a fetch-exception status value therefrom, said fetch address corresponding to a location in said memory of an instruction being read into said instruction queue, said fetch-exception status value indicating whether an address exception condition is detected from said address;

(b) storing said fetch-exception status value in said instruction queue in association with said instruction; and (c) reading said fetch-exception status value from said instruction queue and decoding said fetch-exception status value to determine whether an exception should be taken.

10. The method according to claim 9, wherein step (c) is performed only if said instruction is read from said instruction queue for execution.

11. The method according to claim 9, wherein said step of decoding said fetch-exception status value is performed concurrently with a decode of said instruction.

12. The method according to claim 9, wherein said fetch-exception status value indicates whether a breakpoint address exception condition is detected.

13. The method according to claim 12, wherein said steps (a), (b) and (c) are performed while said microprocessor is operating at normal execution rates.

14. The method according to claim 9, wherein said fetch-exception status value is a multi-bit value which indicates the outcome of multiple address exception tests.

15. The method according to claim 14, wherein said multiple address exception tests include a breakpoint test, a limit error test and a page fault test.

16. The method according to claim 9, further comprising the step of:

(d) taking an exception if said fetch-exception status value indicates that an exception condition was detected in said step (a).

17. The method according to claim 16, wherein said step of taking an exception is performed immediately prior to the execution of said instruction.

18. The method according to claim 9, further comprising the step of:

(d) deleting said fetch-exception status value from said instruction queue if a program branch occurs which prevents said instruction from being executed, to thereby prevent any address exception detected in step (a) from being taken.

19. The method according to claim 9, wherein said step of testing said fetch address is performed before said microprocessor reads said instruction from said memory.

* * * * *

UNITED STATES PATENT AND TRADEMARK OFFICE
CERTIFICATE OF CORRECTION

PATENT NO. : 5,537,559

DATED : July 16, 1996

INVENTOR(S) : James A. Kane, et al.

It is certified that error appears in the above-indentified patent and that said Letters Patent is hereby corrected as shown below:

Delete Claims 1-18 (Column 12, lines 28-67, Column 13, lines 1-49 and Column 14, lines 1-49) and replace with the following claim set (Claims 1-5):

1. A circuit that detects and handles fetch-exceptions for a microprocessor without slowing down the normal operatiotion of said microprocessor, comprising:

an exception circuit that monitors fetch-addresses generated by an execution unit of said microprocessor, and that performs fetch-exception checks on said fetch-addresses before said fetch-addresses are used by said microprocessor to fetch instructions from a memory, said exception circuit generating one or more fetch-exception status bits for each instruction byte of said instructions;

an instruction buffer that receives and stores said instructions fetched by said microprocessor, and that receives and stores said fetch-exception status bits corresponding to said instruction bytes of said instructions, said instructions bytes and said corresponding fetch-exception status bits being held by said instruction buffer until said instructions are executed;

an instruction control unit that receives said instruction bytes and said corresponding fetch-exception status bits, and that generates micro-instructions based on said instruction bytes and said corresponding status bits, said micro-instructions causing exceptions to be taken by said microprocessor when said fetch-exception status bits indicate a fetch-exception condition; and a fetch address queue that temporarily stores a fetch-address when said microprocessor cannot immediately perform a requested fetch with said fetch address, and that stores fetch-exception status bits corresponding to said fetch-address, said fetch-address and said corresponding fetch-exception status bits being held until said requested fetch is performed, said fetch exception status bits being transferred to said instruction buffer when said requested fetch is performed.

2. A circuit that detects and handles fetch-exceptions for a microprocessor as defined in Claim 1 combined with said memory, said memory being external to said microprocessor, said memory holding said instructions for said microprocessor.

UNITED STATES PATENT AND TRADEMARK OFFICE
CERTIFICATE OF CORRECTION

PATENT NO. : 5,537,559
DATED : July 16, 1996
INVENTOR(S) : James A. Kane, et al.

It is certified that error appears in the above-indentified patent and that said Letters Patent is hereby corrected as shown below:

3. The circuit according to Claim 1, wherein said fetch-exception status bits indicate the outcome of of multiple address exception tests.
    4. The circuit according to Claim 1, wherein said fetch-exception status bits indicate whether a breakpoint address exception condition is detected.
    5. The circuit according to Claim 4, wherein the circuit enables breakpoint exceptions to be detected and processed without slowing down the normal operation of the microprocessor.

Signed and Sealed this

Eleventh Day of February, 1997

Attest:

BRUCE LEHMAN

*Attesting Officer*       *Commissioner of Patents and Trademarks*